3,169,950
PROCESS FOR DEODORIZING POLYMERS

Raymond L. Etter, Jr., and Preston S. Copenhaver, Jr., Longview, Tex., assignors to Eastman Kodak Company, Rochester, N.Y., a corporation of New Jersey
No Drawing. Filed May 15, 1961, Ser. No. 109,896
5 Claims. (Cl. 260—94.9)

This invention relates to a process for removing odoriferous materials from emulsifiable polymers. In a specific aspect, this invention relates to a process for removing odoriferous materials from emulsifiable polymeric waxes. In a more specific aspect, this invention relates to a process for removing odoriferous materials from emulsifiable polymeric waxes produced by thermally degrading a higher molecular weight polyethylene and oxidizing resulting degraded polymer.

Synthetically prepared emulsifiable waxes have been used for some time in place of naturally occurring waxes, such as carnauba wax. The naturally occurring waxes had found many uses as a result of their relatively high melting point, low viscosity, freedom from tack, ability to take a high polish and their thixotropic properties, which made them particularly useful as ingredients in various polishing compositions. However, the naturally occurring waxes, such as carnauba wax, were found in regions that were relatively inaccessible, and, as a consequence, they were available in only relatively limited quantities and at excessively high costs.

In many compositions where carnauba wax and other naturally occurring waxes had been used, it was found that synthetically prepared amorphous polymers could be used with equally desirable and, in some instances, better results and at considerably lower costs. An example of a synthetically prepared polymeric wax that has been used on compositions in which carnauba and other similar waxes had previously been used in the emulsifiable wax produced by thermally degrading a polyethylene to a polymer having a substantially lower molecular weight and then oxidizing the resulting degraded polymer. A method for preparing such an emulsifiable polymeric wax is described in detail in copending application, Serial No. 486,974, filed February 8, 1955. The emulsifiable polymeric waxes prepared synthetically have possessed many advantages over the naturally occurring waxes, such as a substantial price differential and ready and easy accessibility. However, these synthetically prepared polymeric waxes have possessed the very definite disadvantage of containing odoriferous materials which imparted an odor that in many uses was highly undesirable. These odoriferous materials in the synthetically prepared polymeric waxes apparently are produced during the thermal degradation and oxidation steps, and it has been known for some time that these odoriferous materials are highly undesirable in the wax. Efforts have been made in the past to remove these odoriferous materials from the polymeric wax with only limited success, and the procedures that were employed were found to be too expensive for commerical operations. Instead of removing these odoriferous materials from the synthetically prepared polymeric waxes, others working in this field have attempted to add various compounds to the polymeric waxes in order to hide or mask the odor. These compounds are known as masking agents, and some of the synthetically prepared polymeric waxes presently being marketed commercially contain rather strong masking agents in order to hide or conceal the undesirable effects of these odoriferous materials.

It is an object of this invention to provide a novel process for the removal of odoriferous materials from synthetically prepared emulsifiable polymers. It is another object of this invention to provide a novel process for removing odoriferous materials from emulsifiable polymeric waxes prepared by thermally degrading polyethylene to form a lower molecular weight polymer and oxidizing resulting polymer to form an emulsifiable wax.

The objects of this invention are accomplished by stripping odoriferous materials from the synthetically prepared emulsifiable polymer by contacting the emulsifiable polymer with an aqueous fluid at a temperature of at least 40° C. but below the softening point of the emulsifiable polymer. As a result the practice of this invention, it is possible to remove the odoriferous materials from the emulsifiable polymer and to produce a substantially odor-free emulsifiable polymer. The removed odoriferous materials are present in the aqueous fluid that has been in contact with the emulsifiable polymer, and, if desired, can be readily removed therefrom by any suitable means, such as distillation and the like.

The emulsifiable polymeric waxes that are treated in accordance with our invention for removal of odoriferous materials therefrom can be prepared by thermally degrading a higher modecular weight polyethylene and then oxidizing resulting degraded polymer to impart emulsifiability to the polymer. A suitable procedure for preparing an emulsifiable polymeric wax of this type is described in application Serial No. 486,974. By way of example, a polyethylene having a molecular weight of from 10,000 to 30,000 and higher can be thermally degraded to form a polymer of substantially lower molecular weight, for example, a molecular weight within the range of 1,000 to 8,000 and higher. It will be understood, of course, that ethylene polymers having molecular weights outside of the ranges indicated can be employed in our process and that the thermally degraded polymer can also have a molecular weight outside of the range indicated. The degradation is initiated by heat and the degradation of the polymer usually takes place at points of chain branching in the carbon chain. The degree of thermal degradation is controlled by reaction time and temperature in order to produce a degraded polymer having the desired properties. Usually, the degraded polymer will have a molecular weight within the range of 1,000 to 8,000, preferably from 2,000 to 4,500, and a softening point of about 90 to 110° C. By careful control of the degradation time and temperature, it is possible to produce a degraded polymer having a relatively narrow molecular weight range. The degraded polymer thus produced is not emulsifiable but emulsifiability can be imparted to the degraded polymer by oxidation. The oxidation step can be carried out by contacting the degraded polymer in a molten condition with a stream of air or other oxygen-containing gas. During the oxidation, the acid number and saponification number of the degraded polymer increase until the degraded polymer is completely emulsifiable. The oxidation of the degraded polymer can be carried out with or without a suitable oxidation catalyst. Among the catalysts that can be used are organic peroxides and hydroperoxides. Specifically, the oxidation can be carried out in the presence of ditertiary butyl peroxide as a catalyst. The use of a peroxy catalyst for the oxidation reaction eliminates induction periods and the presence of the catalyst has little, if any, effect on the acid number and other properties of the polymer. If desired, a stabilizing agent, such as an alkali metal carbonate, for example sodium carbonate and potassium carbonate, can be employed during the oxidation reaction. The presence of the stabilizing agent in the oxidation step results in a more rapid reaction, and the reaction is somewhat smoother since it stabilizes the oxidation intermediates. Also, the presence of a stabilizing agent results in a product that is slightly harder than the product that is obtained when no stabilizing agent is present.

The temperature is particularly important in controlling the oxidation reaction and in obtaining the desired properties of the emulsifiable polymer. Although temperatures varying from 100 to 250° C. can be employed for the oxidation reaction, it is preferable to employ a temperature within the range of 110 to 150° C. At temperatures below this preferred range, the oxidation reaction proceeds rather slowly, and at higher temperatures undesirable cross-linking of the polymer chains can occur resulting in increased viscosities of the polymer.

In producing the emulsifiable polymeric material containing odor bodies for use in our process, any suitable low, medium or high density polyethylene can be used. However, it is preferred to employ a low or medium density polyethylene and usually the polyethylene that is employed in our process will have a density not in excess of 0.935. It will be realized, however, that the density of the polyethylene can be higher, for example, up to 0.945, and higher, is desired.

The emulsifiable polymeric waxes that are treated in accordance with our invention usually have a softening point below 110° C. and a molecular weight within the range of 1,000 to 8,000. The acid number of the polymeric waxes can be within the range of 4 to 25 and preferably within the range of 8 to 15. Also, the wax is usually completely or 100% emulsifiable.

In order to remove the odoriferous materials from the emulsified polymer described above, the emulsifiable polymer is contacted with an aqueous fluid, viz., either water or steam at a temperature of at least 40° C. and below the softening point of the emulsifiable polymer. Usually, the temperature is within the range of 40 to 100° C. In some instances, temperatures below 100° C. are used in order that the temperature will be below the softening point of the emulsifiable polymer being treated. The pressure that is used can be either atmospheric or a sub-atmospheric pressure. When emulsifiable polymers having a relatively lower softening point are used, it is preferred to use a sub-atmospheric pressure in order that the water employed to treat the polymer can be at its boiling point and below the softening point of the polymer. It will be realized, however, that the water that is used can be at a temperature below its boiling point at the pressure employed whenever such conditions appear to be desirable.

The deodorization of emulsifiable polymer can be carried out in accordance with our invention either in a batchwise or a continuous manner. When the process is carried out batchwise, the emulsifiable polymer in particulate form is dispersed in water. If the water is not at the desired temperature and pressure, these conditions will be suitably adjusted. The treatment of the emulsifiable polymer is continued for a period of 0.5 to 6 hours, and the odor forming bodies are carried off from the emulsifiable polymer with the water vapor. Preferably, the water is at its boiling point and a distillate of water and odoriferous material is removed from the batch process.

When the deodorization process is carried out in a continuous manner, particles of emulsifiable polymer are contacted with either water or steam in a concurrent or countercurrent manner. The contacting is carried out in an elongated column that is suitable for such purposes. It is possible to employ countercurrent operation of such a column, and in this method of operation, the emulsifiable polymer particles are usually added to the top of the column and a stream of hot water or steam is introduced to the bottom of the column. The water or steam leaving the top of the column contains the odoriferous material removed from the emulsifiable polymer, and this contaminated water can be treated, for example, with charcoal in order to remove the odor-forming bodies. The emulsifiable polymer particles that leave the bottom of the countercurrent operated column are substantially odor-free, but otherwise the properties of the emulsifiable polymer are not altered in any way during the deodorization step.

After treatment of the emulsifiable polymer for a suitable period of time depending upon odor content of the polymer, rate of water or steam flow, temperature of operation, amount of polymer to be deodorized, etc., the deodorized polymer is dried, for example, by passing hot air through the polymeric particles or simply by draining the hot water from the polymeric particles and allowing adhered moisture to evaporate. The dried polymer which has thus been deodorized and dried is then available for further processing.

Our deodorization process is quite advantageous in that it is effective for removing substantially all odoriferous material from the emulsifiable polymer without altering the physical properties of the polymer being treated. It is unnecessary to employ any masking compounds with our polymer, although in some instances our process can be operated in such a manner that not all of the odoriferous materials are removed, and in those instances some odor masking agent can be subsequently added to the polymer in a limited and reduced amount. It is also possible to employ our invention for the removal of odoriferous materials from any emulsifiable polymeric wax prepared in the manner described above regardless of the molecular weight or the melting point of the wax.

The following examples are illustrative of our invention.

*Example 1*

An 80-gallon stirred vessel was charged with 40 gallons of water and 20 pounds of odor-containing emulsifiable polymeric wax produced by the oxidation of thermally degraded high-pressure polyethylene. The wax had a density of about 0.935 and a molecular weight of about 2,500. The stirrer was started and water heated to boiling and distillate removed continuously. The water distilled over had a very strong odor. Samples were taken from the vessel at 30-minute to 1-hour intervals during the treatment and submitted to an odor panel for testing. Rating of the odor panel:

100—little or no detectable odor
90—some odor present but not unpleasant
80—considerable odor present, slightly unpleasant
70—considerable odor present, decidedly unpleasant
60—strong odor present, very unpleasant Ninety or above was considered to be passing by 90 to 95% of the people testing. All data given in these examples is in an average of 12 persons' testings.

Sample: Odor-rating
  Blank (feed material) _____ 70
  30-minute sample _____ 80
  1-hour sample _____ 90–95
  6-hour sample _____ 90–95

The physical properties of the wax before and after deodorization are given below:

| | Before Deodorization | After Deodorization |
|---|---|---|
| Color | 1 | 1 |
| Softening Point (Ring and Ball), °C | 105 | 106 |
| Penetration Hardness, mm. $\times 10^{-1}$ | 2.1 | 200 |
| Acid Number | 10.5 | 10.1 |
| Viscosity (Brookfield at 125 °C.) | 1,015 | 1,080 |
| Emulsifiability | Clear emulsion | Clear emulsion |

*Example 2*

The same procedure as used in Example 1, with the exception that a lower melting, lower molecular weight, odor-containing polymeric wax prepared in a similar manner was used. The steam stripping was done under reduced pressure to lower the temperature of the water to approximately 70 to 80° C. to prevent melting of polymer. Odor tests revealed the following.

Sample: Odor-rating
- Blank _____ 60
- 1-hour sample _____ 90
- 6-hour sample _____ 95–100

The physical properties of the wax before and after deodorization are given below:

|  | Before Deodorization | After Deodorization |
|---|---|---|
| Color | 1 | 1 |
| Softening Point (Ring and Ball), °C | 103 | 103 |
| Penetration Hardness, mm. $\times 10^{-1}$ | 4.2 | 4.0 |
| Acid Number | 12.2 | 12.3 |
| Viscosity (Brookfield at 125° C.) | 350 | 365 |
| Emulsifiability | Clear emulsion | Clear emulsion |

*Example 3*

A 6-inch glass column 4 feet long was packed with odor-containing polymeric wax similar to the wax used in Example 1, and hot water was pumped through the bed of polymer at a temperature of 80° C. The water, after passing through the column, was brought to a boil to remove the odoriferous materials by steam distillation. The deodorized water was then recycled through the column. The process was stopped after two hours and samples of the wax submitted for odor evaluation.

Sample: Odor-rating
- Blank _____ 70
- 2-hour sample _____ 90

*Example 4*

A glass column was fitted with a stirrer to agitate the pellets of degraded, oxidized polymeric wax similar to the wax used in Example 1 throughout the entire length of the column. Water was then pumped through the pellets as in Example 3 at a temperature of 80° C.

Sample: Odor-rating
- Blank _____ 70
- 2-hour sample _____ 95–100

*Example 5*

A glass column as described in Example 4 was adapted so that the pellets of degraded, oxidized polymeric wax could be added from the top and removed from the bottom continuously while water was passed from the bottom of the column to the top continuously. A countercurrent extraction was thereby achieved. Samples of the treated polymer were submitted for odor evaluation.

Sample: Odor-rating
- Blank _____ 60
- 1-hour sample _____ 90
- 2-hour sample _____ 95
- 4-hour sample _____ 95

Although the invention has been described in considerable detail with reference to certain preferred embodiments thereof, variations and modifications can be effected within the spirit and scope of the invention as described hereinabove and as defined in the appended claims.

We claim:

1. The method for removing odoriferous materials from an emulsifiable polymer produced by thermally degrading a higher molecular weight polyethylene and oxidizing the resulting thermally degraded polymer which comprises stripping said odoriferous materials from said emulsifiable polymer by contacting said emulsifiable polymer with water at a temperature of 40° C. to 100° C. but below the softening point of said emulsifiable polymer.

2. The method for removing odoriferous materials from an emulsifiable polymeric wax produced by thermally degrading a higher molecular weight polyethylene and oxidizing the resulting thermally degraded polymer which comprises contacting said emulsifiable polymeric wax concurrently with a stream of water in an elongated stripping zone at a temperature of 40° C. to 100° C. but below the softening point of said emulsifiable polymeric wax and removing odoriferous materials overhead from said stripping zone.

3. The method for removing odoriferous materials from an emulsifiable polymeric wax produced by thermally degrading a higher molecular weight polyethylene and oxidizing the resulting thermally degraded polymer which comprises contacting said emulsifiable polymeric wax countercurrently with a stream of water in an elongated stripping zone at a temperature of 40° C. to 100° C. but below the softening point of said emulsifiable polymeric wax and removing odoriferous materials overhead from said stripping zone.

4. The method for removing odoriferous materials from an emulsifiable polymeric wax produced by thermally degrading a higher molecular weight polyethylene and oxidizing the resulting thermally degraded polymer which comprises passing a stream of water through an elongated stripping column packed with particles of said emulsifiable wax, said water being at a temperature of 40° C. to 100° C. but below the softening point of said emulsifiable polymeric wax and removing water containing said odoriferous materials from said stripping column.

5. The method for removing odoriferous materials from an emulsifiable polymeric wax produced by thermally degrading a higher molecular weight polyethylene and oxidizing the resulting thermally degraded polymer which comprises stripping said odoriferous materials from said emulsifiable polymeric wax by contacting said emulsifiable polymeric wax with boiling water at a temperature of 40° C. to 100° C. but below the softening point of said emulsifiable polymeric wax for a period of 0.5 to 6 hours at a pressure such that the water is maintained at its boiling point.

References Cited in the file of this patent

UNITED STATES PATENTS

| 2,372,001 | Joyce | Mar. 20, 1945 |
| 2,828,296 | Guillet | Mar. 25, 1958 |
| 2,838,477 | Roelen et al. | June 10, 1958 |
| 2,928,816 | Chapman et al. | Mar. 15, 1960 |
| 3,083,193 | Kolner | Mar. 26, 1963 |